United States Patent
Heo et al.

(10) Patent No.: US 6,347,177 B1
(45) Date of Patent: Feb. 12, 2002

(54) OPTICAL FIBER FOR LIGHT AMPLIFIER

(75) Inventors: Jong Heo, Pohang; Dong-Chin Lee, Pusan; Se-Ho Park, Seoul; Sun-tae Jung, Anyang; Hyoun-soo Kim, Sungnam, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/417,058

(22) Filed: Oct. 13, 1999

(30) Foreign Application Priority Data

Oct. 13, 1998 (KR) .............................................. 98-42713

(51) Int. Cl.[7] .............................................. G02B 6/00
(52) U.S. Cl. .......................... 385/142; 385/123; 501/37; 359/341
(58) Field of Search ........................ 385/123, 126–132, 385/141–143; 359/341; 501/37

(56) References Cited

U.S. PATENT DOCUMENTS

| | | | | |
|---|---|---|---|---|
| 5,486,947 A | * | 1/1996 | Ohishi et al. | 359/341 |
| 5,629,953 A | * | 5/1997 | Bishop et al. | 372/39 |
| 5,847,865 A | * | 12/1998 | Gopinath et al. | 359/343 |
| 5,973,824 A | * | 10/1999 | Sanghera et al. | 359/341 |

* cited by examiner

*Primary Examiner*—Akm E. Ullah
*Assistant Examiner*—Michelle R. Connelly-Cushwa
(74) *Attorney, Agent, or Firm*—Robert E. Bushnell, Esq.

(57) ABSTRACT

An optical fiber used for an optical amplifier, is formed by doping glass with rare-earth ions. Both praseodymium ions ($Pr^{+3}$) and erbium ions ($Er^{+3}$) are used as the rare-earth ions, and the glass is a fluoride glass or a sulfide glass. The optical fiber can be used at wavelengths of both 1.3 $\mu$m and 1.55 $\mu$m. The light amplification efficiency of an optical amplifier made of the optical fiber can be improved compared to that of an optical amplifier formed of only $Pr^{+3}$ or only $Er^{+3}$.

27 Claims, 6 Drawing Sheets

OPTICAL FIBER FOR LIGHT AMPLIFIER

CLAIM OF PRIORITY

This application makes reference to, incorporates the same herein, and claims all benefits accruing under 35 U.S.C. §119 from an application for OPTICAL FIBER FOR LIGHT AMPLIFIER earlier filed in the Korean Industrial Property Office on Oct. 13, 1998 and there duly assigned Ser. No. 42713/1998.

BACKGROUND OF THE INVENTION

1. Field of the Invention

The present invention relates to optical fibers for use in a light amplifier, and more particularly, to an optical fiber for use in alight amplifier which can be used at wavelengths of both 1.3 $\mu$m and 1.55 $\mu$m.

2. Description of the Related Art

The wavelength of light used in optical communications has shifted from the wavelength of 1.3 $\mu$m to the wavelength of 1.55 $\mu$m. In general, praseodymium ions ($Pr^{+3}$) are used to dope an optical fiber used to amplify an optical signal having a wavelength of 1.3 $\mu$m, while erbium ions ($Er^{+3}$) are used to dope an optical fiber used to amplify an optical signal having a wavelength of 1.55 $\mu$m.

U.S. Pat. No. 5,486,947, to Ohishi et al., entitled OPTICAL FIBER FOR OPTICAL AMPLIFIER, discloses an optical fiber for use in an optical amplifier, which is capable of operating with sufficient optical gain at the 1.3 $\mu$m wavelength band. The optical fiber is a fluoride glass optical fiber containing rare earth metal ions in a core glass, wherein the refractive index difference between the core and a cladding layer is above 1.4%, and the glass contains lead difluoride ($PbF_2$) in a proportion of 25 mol % or less based on the total composition for forming the glass. However, this fiber is designed for amplification of the 1.3 $\mu$m wavelength band.

Now, both wavelengths of 1.3 $\mu$m and 1.55 $\mu$m are used in many optical communications related fields. Thus, different parts, that is, separate parts suitable for each wavelength, are required to construct a single optical circuit, and the costs of development and of switching devices from one wavelength to the other are high.

SUMMARY OF THE INVENTION

It is therefore an object of the present invention to provide an improved optical amplifier.

It is a further object of the invention to provide an optical device not requiring separate components for both the 1.3 and 1.55 $\mu$m bands.

It is another object of the invention to provide an optical amplifier for both the 1.3 and 1.55 $\mu$m bands which is less expensive.

It is still another object of the invention to provide an optical amplifier with improved amplification efficiency.

It is a yet further object to provide an optical fiber for use in an optical amplifier which can be used for both the 1.3 and 1.55 $\mu$m bands.

It is yet another object to provide an optical glass which can be used in an optical amplifier for both the 1.3 and 1.55 $\mu$m bands.

According to an aspect of the present invention, there is provided an optical fiber for an optical amplifier, which is formed by doping glass with rare-earth ions, wherein both praseodymium ions ($Pr^{+3}$) and erbium ions ($Er^{+3}$) are used as the rare-earth ions, and the glass is a fluoride glass or a sulfide glass. That is, the fiber is formed of a glass which is a fluoride or sulfide glass further as containing both $Pr^{+3}$ and $Er^{+3}$.

Preferably, the content of $Pr^{+3}$ is in the range of approximately 100 to 1000 ppm by weight and the content of $Er^{+3}$ is in the range of approximately 100 to 5000 ppm by weight. If the $Pr^{+3}$ or $Er^{+3}$ content is outside the above range, light amplification efficiency is undesirably lowered. Also, the mixing ratio of $Pr^{+3}$ to $Er^{+3}$, by weight, may be between 1:1 and 1:3. If the ratio of $Pr^{+3}$ to $Er^{+3}$ exceeds the above ratio, fluorescence emission quantity at the wavelength of 1.55 $\mu$m is decreased. Conversely, if the ratio of $Pr^{+3}$ to $Er^{+3}$ is less than the above ratio, the amplification at the wavelength of 1.3 $\mu$m is unfavorably decreased.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 3:
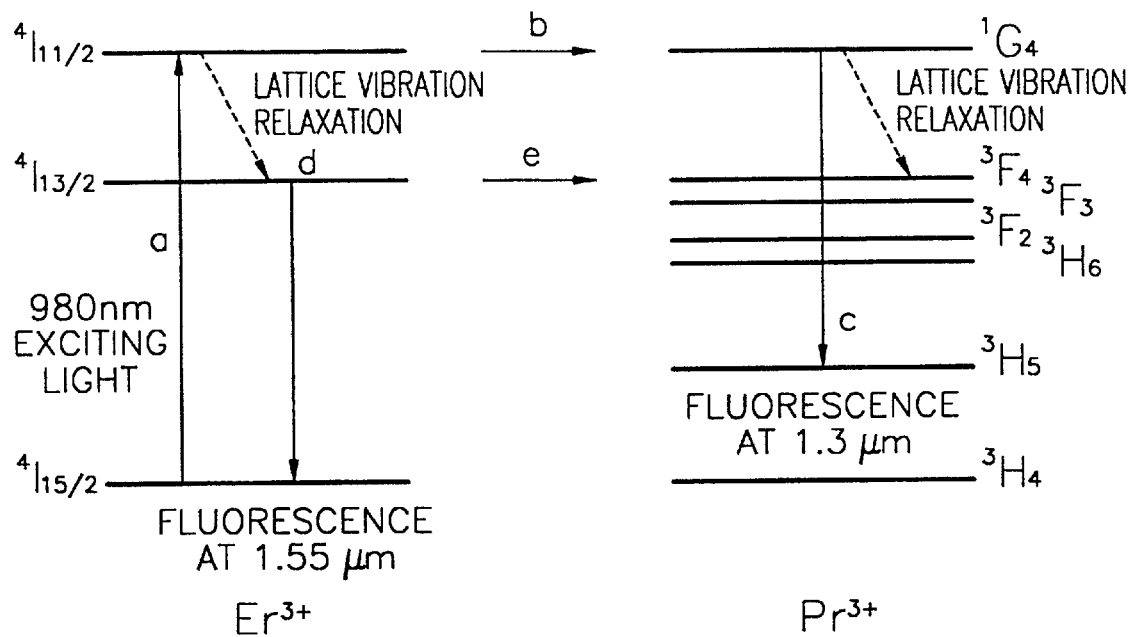
FIG. 3 is a diagram illustrating energy transfer between $Pr^{+3}$ and $Er^{+3}$ ions.

The present invention provides an optical fiber for use in a light amplifier, which can be used at wavelengths of both 1.3 µm and 1.55 µm, by using a laser beam having a wavelength of 980 nm as a light source for exciting the optical fiber. In the present invention, the term "fibers" refers to shapes with a wide range of diameters, not merely thin fibers. For example, a fiber may have diameter of 5 to 100 mm. In the present invention, the fiber contains $Pr^{+3}$ and $Er^{+3}$, wherein the maximum absorption peak of $Er^{+3}$ in a laser beam having wavelength 980 nm is at the $^4I_{11/2}$ level. In this case, the two ions are simultaneously excited, so that $Pr^3$ emits fluorescence at 1.3 µm and $Er^{+3}$ emits fluorescence at 1.55 µm. In particular, as shown in FIG. 3, the fluorescence lifetime of $Pr^{+3}$ at the $^1G_4$ level is elongated due to the energy transfer from $Er^{+3}$, so that light amplification efficiency is improved compared to a conventional optical fiber containing only $Pr^{+3}$.

Preferably, in the present invention, the $Pr^{+3}$ and $Er^{+3}$ are in a fluoride or sulfide glass, which is used to minimize lattice vibration relaxation of $Pr^{+3}$ from the $^1G_4$ level to $^3F_4$ level. The fluoride glass may be a ZBLAN glass which is a fluoride glass containing zirconium (Zr), barium (Ba), lanthanum (La), aluminum (Al) and sodium (Na), and the sulfide glass may be a germanium-arsenic-gallium-sulfur (Ge—As—Ga—S) or Ge—As—S glass. Here, using a sulfide glass can further minimize the lattice vibration relaxation of $Pr^{+3}$ from the $^1G_4$ level to the $^3F_4$ level compared to the case of using the fluoride glass. However, using a fluoride glass rather than a sulfide glass generally makes the manufacture of optical fiber easier.

In order to maximize the light amplification efficiency at both wavelengths of 1.3 µm and 1.55 µm, the mixing weight ratio of $Pr^{+3}$ and $Er^{+3}$ may be adjusted to be between 1:1 and 1:3.

Hereinafter, the present invention will be described using the following examples. However, these examples are merely illustrative and the present invention is not limited thereto.

COMPARATIVE EXAMPLE 1

Ge, As, Ga and S having a purity of 99.999% or more, were weighed in an atomic ratio of 29:8:1:62 in a glove box where the content of hydroxy (OH) group and oxygen was maintained to be 10 ppm or less, and Pr metal powder was added in the amount of 300 ppm to give the $Pr^{+3}$.

After filling a $SiO_2$ test tube with the above composition, the test tube was left under a vacuum condition of 0.1 mTorr for a predetermined period of time. Then, the test tube was made airtight by sealing it with an oxy-propane flame.

Following this, the test tube was put into a rocking furnace such that the composition contained in the test tube was completely mixed, and the resultant was kept at 950° C. for 12 hours. Then, the test tube was quenched in air, and heated in a furnace which was set at 400° C. for 1 hour. After the heating process, the test tube was slowly cooled to room temperature and broken into pieces, resulting in an optical fiber formed of a $Pr^{+3}$-doped sulfide glass of $Ge_{29}As_8Ga_1S_{62}$ in which the amount of lattice vibration relaxation was slight. The optical fiber was cut into a disc shape (having a diameter of 10 mm and a thickness of 3 mm) and polished.

Figure 4:
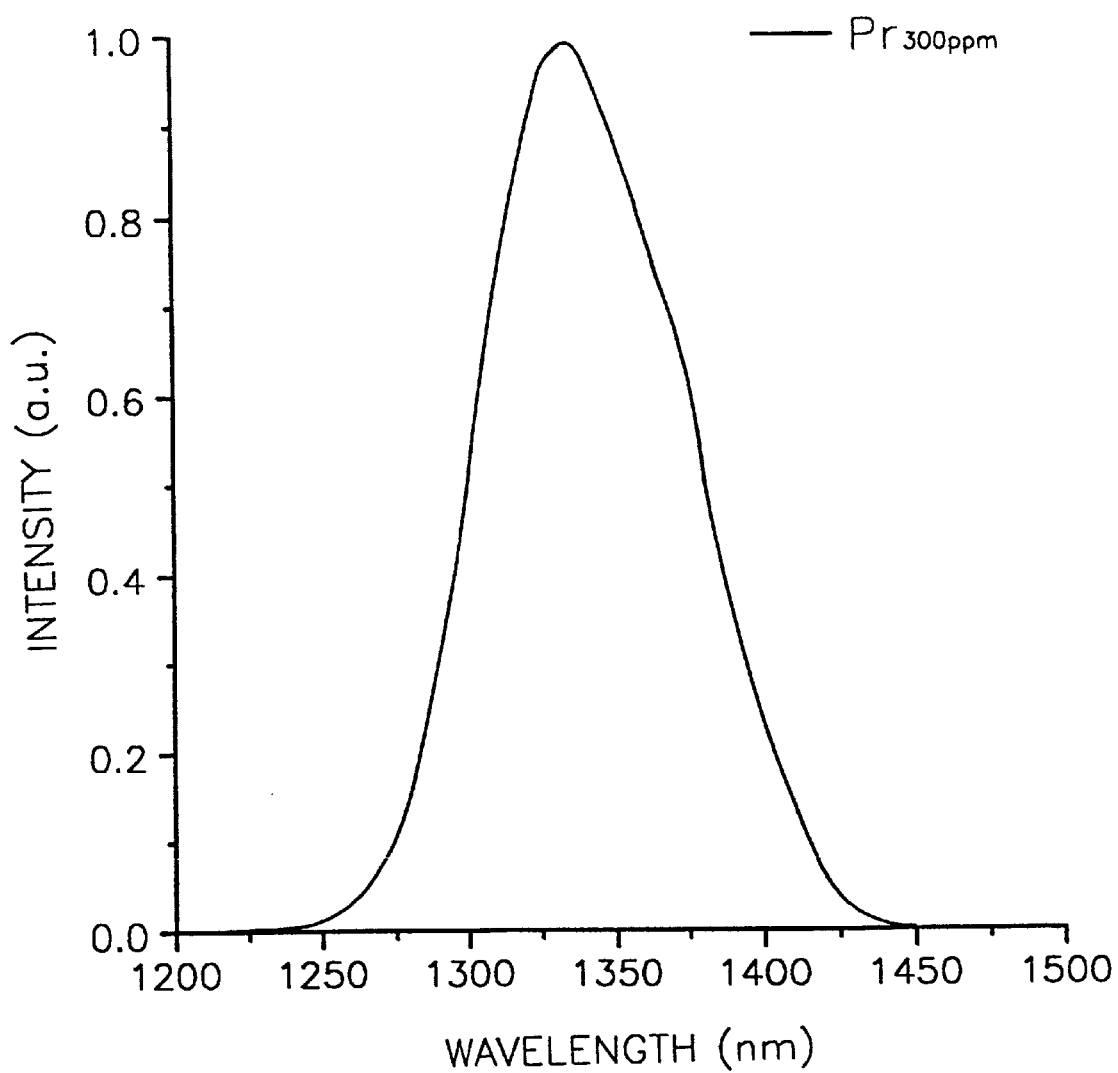
FIG. 4 shows the fluorescence emission spectrum at the wavelength of 1.3 $\mu$m by the electron transition of $Pr^{+3}$ from the $^1G_4$ level to the $^3H_5$ level when a laser beam having a wavelength of 1020 nm is irradiated onto an optical fiber which is formed by doping a $Ge_{29}As_8Ga_1S_{62}$ glass with $Pr^{+3}$.

Then, the fluorescence spectrum and fluorescence lifetime of the resultant were measured using a laser beam having a wavelength of 1017 mn as a source of light excitation. At this wavelength, $Pr^{+3}$ at the $^1G_4$ level showed a maximum light absorption. As a result, the fluorescence emission at a wavelength of 1.3 µm, which was caused by electron transition of $Pr^{+3}$ from the $^1G_4$ level to $^3H_5$ level, was observed (see FIG. 4), and the fluorescence lifetime was 305 µsec (see FIG. 2).

COMPARATIVE EXAMPLE 2

An optical fiber was manufactured in the same manner as in Comparative Example 1 except that $Er^{+3}$ was used instead of $Pr^{+3}$. $Er_2S_3$ was used as the source of $Er^{+3}$ ions. Then, the optical fiber was cut into a disc shape (having a diameter of 10 mm and a thickness of 3 mm) and polished. Then, the fluorescence spectrum and fluorescence lifetime of the resultant were measured using a laser beam having a wavelength of 980 nm as a source of light excitation. At this wavelength, $Er^{+3}$ at the $^4I_{11/2}$ level showed a maximum light absorption.

Figure 2:
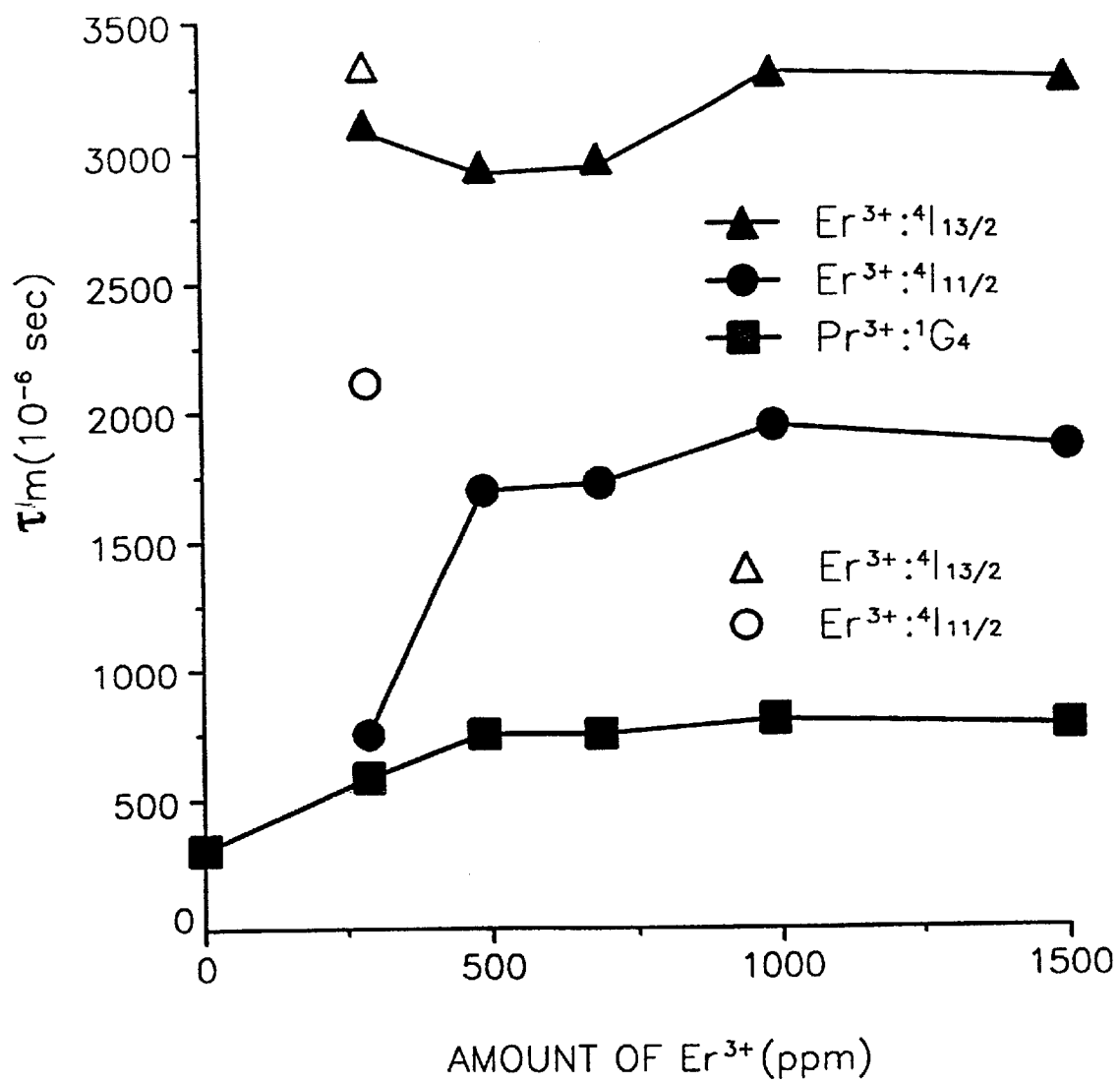
FIG. 2 is a graph showing the fluorescence lifetime of $Pr^{+3}$ at the $^1G_4$ level and of $Er^{+3}$ at the $^4I_{13/2}$ level and $^4I_{11/2}$ level according to the amount of $Er^{+3}$ in optical fibers, when a laser beam having a wavelength of 980 nm is irradiated onto an optical fiber which is formed by doping a $Ge_{29}As_8Ga_1S_{62}$ glass with $Pr^{+3}$ and $Er^{+3}$.
Figure 5:
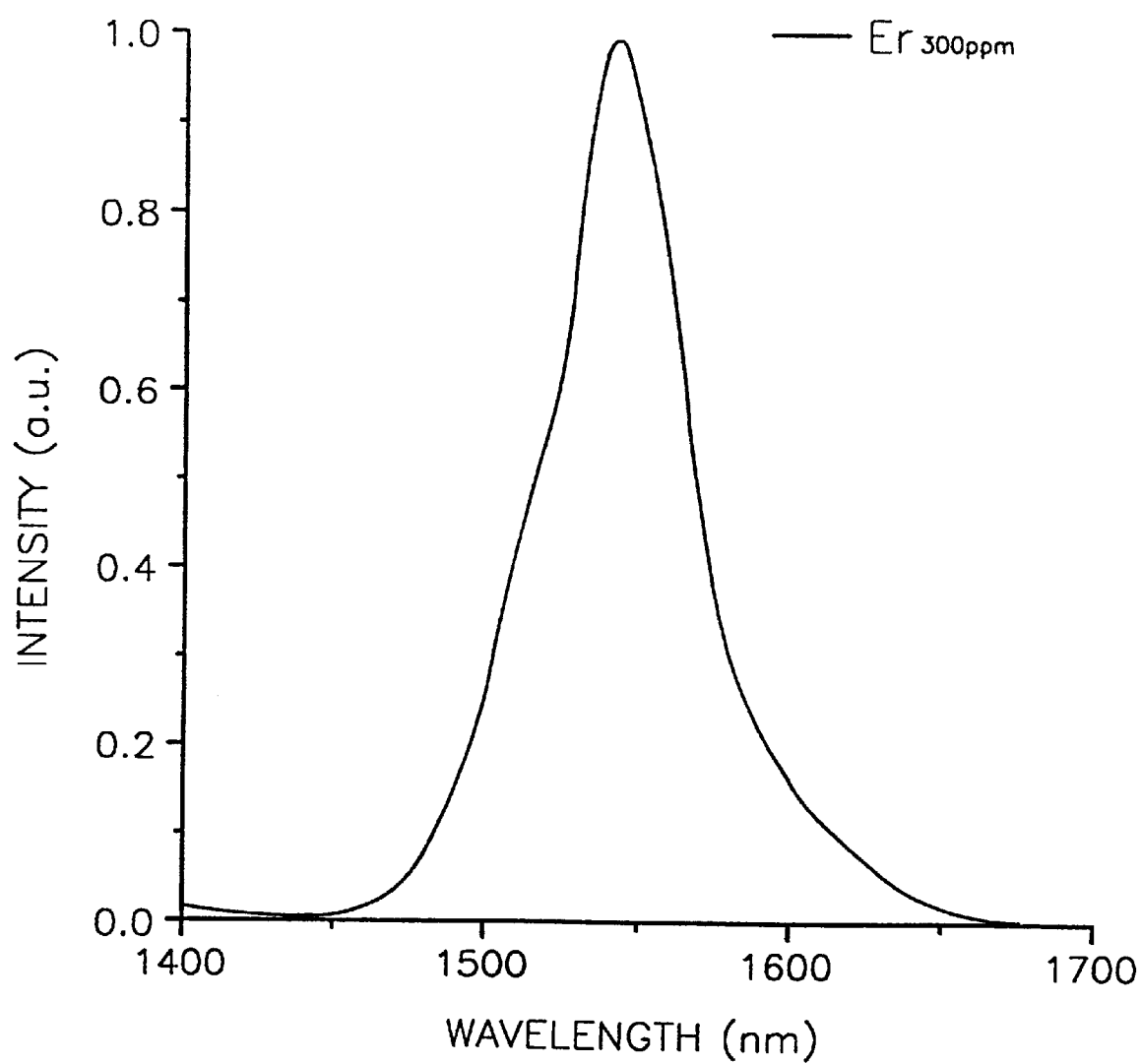
FIG. 5 shows the fluorescence emission spectrum at the wavelength of 1.55 $\mu$m by the electron transition of $Er^{+3}$ from the $^4I_{13/2}$ level to the $^4I_{15/2}$ level when a laser beam having a wavelength of 980 nm is irradiated onto an optical fiber which is formed by doping a $Ge_{29}As_8Ga_1S_{62}$ glass with $Er^{+3}$.

As a result, the fluorescence emission at a wavelength of 1.55 µm, which was caused by electron transition of $Er^{+3}$ from the $^4I_{13/2}$ level to the $^4I_{15/2}$ level, was observed (see FIG. 5), and fluorescence lifetime at the $^4I_{11/2}$ and $^4I_{13/2}$ levels was 2100 µsec and 3400 µsec, respectively (see FIG. 2)

EXAMPLE 1

An optical fiber was manufactured in the same manner as in Comparative Example 1 except that $Er^{+3}$ was further added in the amount of 300 ppm together with 300 ppm of $Pr^{+3}$. Then, the optical fiber was cut into a disc shape (having a diameter of 10 mm and a thickness of 3 mm) and polished. Then, the fluorescence spectrum and fluorescence lifetime of the resultant were measured using a laser beam having a wavelength of 980 nm as a source of light excitation. At this wavelength, $Er^{+3}$ at the $^4I_{11/2}$ level showed a maximum light absorption.

Figure 1:
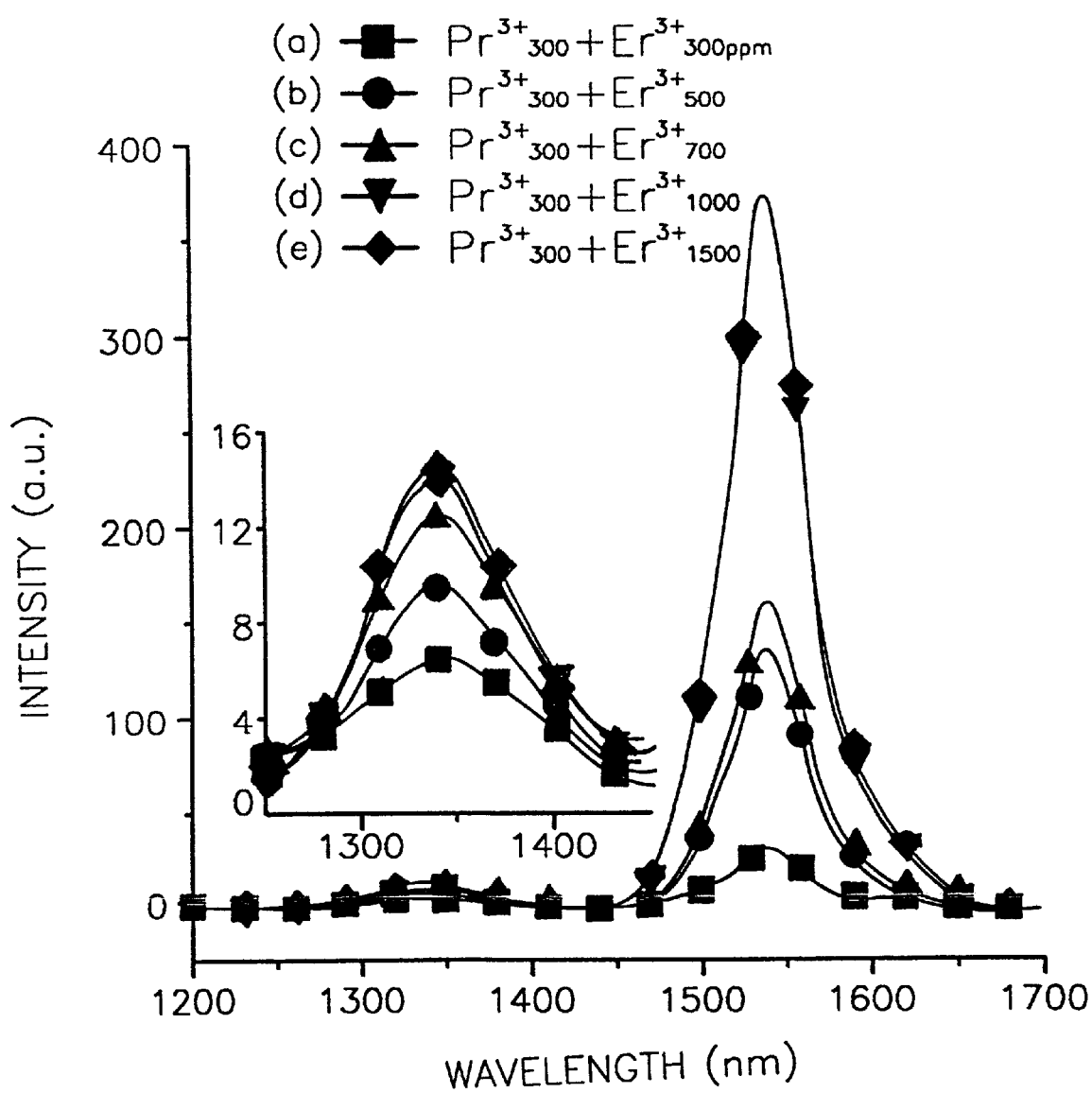
FIG. 1 shows the fluorescence emission spectrum at wavelengths of 1.3 $\mu$m and 1.55 $\mu$m according to the amount of $Er^{+3}$ in optical fibers, when a laser beam having a wavelength of 980 nm is irradiated onto an optical fiber which is formed by doping glass made of $Ge_{29}As_8Ga_1S_{62}$ with $Pr^{+3}$ and $Er^{+3}$, wherein the fluorescence emission at the wavelength of 1.3 $\mu$m is caused by the electron transition of $Pr^{3+}$ from the $^1G_4$ level to the $^3H_5$ level in $Pr^{3+}$ doped fibers, and that at the wavelength of 1.55 $\mu$m is caused by the transition $^4I_{13/2} \rightarrow {}^4I_{15/2}$ in $Er^{3+}$ doped fibers.

As a result, the fluorescence emission of $Pr^{+3}$, which was caused by electron transition from $^1G_4$ level to $^3H_5$ level, and the fluorescence emission of $Er^{+3}$, which was caused by electron transition from $^4I_{13/2}$ level, to the $^4I_{15/2}$ level were observed simultaneously at the wavelengths of 1.3 µm and 1.55 µm, respectively (see FIG. 1(a)). The intensify of fluorescence was increased at each wavelength compared to that of Comparative Examples 1–2. Also, the fluorescence lifetime of $Pr^{+3}$ at the $^1G_4$ level was 605 µsec, and the fluorescence lifetime of $Er^{+3}$ at the $^4I_{11/2}$ and $^1I_{13/2}$ levels was 824 µsec and 3120 µsec, respectively (see FIG. 2).

According to Example 1, as shown in FIG. 3, the simultaneous fluorescence emission at the wavelengths of 1.3 µm and 1.55 µm was due to the effective energy transfer indicated by "b". Thus, the optical fiber obtained in Example 1 can be used at wavelengths of both 1.3 µm and 1.55 µm.

Also, the fluorescence lifetime of $Pr^{+3}$ at the $^1G_4$ level was markedly elongated to 605 µsec compared to Comparative Example 1, and the light amplification efficiency at the wavelength of 1.3 µm was further improved by adding both $Pr^{+3}$ and $Er^{+3}$. However, the fluorescence lifetime of $Er^{+3}$ at the $^4I_{11/2}$ level was 3120 µsec, which is lower than in Comparative Example 2, thus lowering light amplification efficiency. This is due to the energy transfer indicated by "e".

EXAMPLE 2

An optical fiber was manufactured in the same manner as in Comparative Example 1 except that 500 ppm of $Er^{+3}$ was further added together with 300 ppm of $Pr^{+3}$. Then, the optical fiber was cut into a disc shape (having a diameter of 10 mm and a thickness of 3 mm) and polished. Then, the fluorescence spectrum and fluorescence lifetime of the resultant were measured using a laser beam having a wavelength of 980 nm as a source of light excitation. At this wavelength, $Er^{+3}$ at the $^4I_{11/2}$ level showed a maximum light absorption.

As a result, the fluorescence emission of $Pr^{+3}$, which was caused by electron transition from $^1G_4$ level to $^3H_5$ level, and the fluorescence emission of $Er^{+3}$, which was caused by electron transition from $^4I_{13/2}$ level, to the $^4I_{15/2}$ level were observed simultaneously at the wavelengths of 1.3 μm and 1.55 μm, respectively (see FIG. 1(b)). The intensify of fluorescence was increased at each wavelength compared to that of the Comparative Examples 1–2. Also, the fluorescence lifetime of $Pr^{+3}$ at the $^1G_4$ level was 760 μsec, and the fluorescent lifetime of $Er^{+3}$ at the $^4I_{11/2}$ and $^4I_{13/2}$ levels was 1740 μsec and 2910 μsec, respectively (see FIG. 2).

According to Example 2, as shown in FIG. 3, the simultaneous fluorescence emission at the wavelengths of 1.3 μm and 1.55 μm was due to the effective energy transfer indicated by "b". Also, the fluorescence lifetime of $Pr^{+3}$ at the $^1G_4$ level was markedly elongated to 760 μsec compared to Comparative Example 1 and Example 1, and the fluorescence lifetime of $Er^{+3}$ at the $^4I_{13/2}$ level was decreased to 2910 μsec, compared to Comparative Example 2 and Example 1.

From the above result, it can be understood that the energy transfer indicated by "b" and "e" occur more effectively as the content of $Er^{+3}$ increases. However, the fluorescence lifetime of $Er^{+3}$ at the $^4I_{11/2}$ level was increased to 1740 μsec, compared to Example 1. As a result, it was concluded that as $Er^{+3}$, which is not involved in the energy transfer indicated by "b", increases, the energy transfer degree in the direction indicated by "b" decreases.

EXAMPLE 3

An optical fiber was manufactured in the same manner as in Comparative Example 1 except that 700 ppm of $Er^{+3}$ was further added together with 300 ppm of $Pr^{+3}$. Then, the optical fiber was cut into a disc shape (having a diameter of 10 mm and a thickness of 3 mm) and polished. Then, the fluorescence spectrum and fluorescence lifetime of the resultant were measured using a laser beam having a wavelength of 980 nm as a source of light excitation. At this wavelength, $Er^{+3}$ at the $^4I_{11/2}$ level showed a maximum light absorption.

As a result, the fluorescence emission of $Pr^{+3}$, which was caused by electron transition from $^1G_4$ level to $^3H_5$ level, and the fluorescence emission of $Er^{+3}$, which was caused by electron transition from $^4I_{13/2}$ level, to the $^4I_{15/2}$ level were observed simultaneously at the wavelengths of 1.3 μm and 1.55 μm, respectively (see FIG. 1(c)). The intensify of fluorescence was increased at each wavelength compared to that of Examples 1–2. Also, the fluorescence lifetime of $Pr^{+3}$ at the $^1G_4$ level was 769 μsec, and the fluorescence lifetime of $Er^{+3}$ at the $^4I_{11/2}$ and $^4I_{13/2}$ levels was 1760 μsec and 2920 μsec, respectively (see FIG. 2).

According to Example 3, as the content of $Er^{+3}$ increased, the fluorescence lifetime of $Pr^{+3}$ at the $^1G_4$ level was slightly increased. This was due to an increase in energy transfer indicated by "b" shown in FIG. 3. However, because $Er^{3+}$ was contributed for elongating the fluorescence lifetime at the $^4I_{11/2}$ and $^4I_{13/2}$ levels, the ratio of $Er^{+3}$ associated with the energy transfer indicate by "b" and "e" was decreased, thus resulting in a slight increase in fluorescence lifetime of $Pr^{+3}$ at the $^1G_4$ level. That is, the light amplification efficiency at the wavelength of 1.55 μm showed a tendency to increase with an increase in the fluorescence lifetime of $Er^{+3}$ at the $^4I_{13/2}$ level.

EXAMPLE 4

An optical fiber was manufactured in the same manner as in Comparative Example 1 except that 1000 ppm of $Er^{+3}$ was further added together with 300 ppm of $Pr^{+3}$. Then, the optical fiber was cut into a disc shape (having a diameter of 10 mm and a thickness of 3 mm) and polished. Then, the fluorescence spectrum and fluorescence lifetime of the resultant were measured using a laser beam having a wavelength of 980 nm as a source of light excitation. At this wavelength, $Er^{+3}$ at the $^4I_{11/2}$ level showed a maximum light absorption.

As a result, the fluorescence emission of $Pr^{+3}$, which was caused by electron transition from $^1G_4$ level to $^3H_5$ level, and the fluorescence emission of $Er^{+3}$, which was caused by electron transition from $^4I_{13/2}$ level, to the $^4I_{15/2}$ level were observed simultaneously at the wavelengths of 1.3 μm and 1.55 μm, respectively (see FIG. 1(d)). The intensify of fluorescence was increased at each wavelength compared to that of Examples 1–3. Also, the fluorescence lifetime of $pr^{+3}$ at the $^1G_4$ level was 881 μsec, and the fluorescent life time of $Er^{+3}$ at the $^4I_{13/2}$ and $^4I_{13/2}$ levels was 2030 μsec and 3340 μsec, respectively (see FIG. 2).

According to Example 4, as shown in FIG. 3, the simultaneous fluorescence emission at the wavelength of 1.3 μm by $Pr^{+3}$ at the $^1G_4$ level, and at the wavelength of 1.55 μm by $Er^{+3}$ at the $^4I_{13/2}$ level, was due to effective energy transfer indicated by "b". Also, the fluorescence lifetime of $Er^{+3}$ at the $^4I_{11/2}$ and $^4I_{13/2}$ levels showed the maximum levels. Thus, it can be understood that the mixing ratio of $Pr^{+3}$ and $Er^{+3}$ in this embodiment shows the maximum light amplification efficiency at both 1.3 μm and 1.55 μm.

EXAMPLE 5

An optical fiber was manufactured by the same manner as in Comparative Example 1 except that 1500 ppm of $Er^{+3}$ was further added together with 300 ppm of $Pr^{+3}$. Then, the optical fiber was cut into a disc shape (having a diameter of 10 mm and a thickness of 3 mm) and polished. Then, the fluorescence spectrum and fluorescence lifetime of the resultant were measured using a laser beam having a wavelength of 980 mn as a source of light excitation. At this wavelength, $Er^{+3}$ at the $^4I_{11/2}$ level showed a maximum light absorption.

As a result, the fluorescence emission of $Pr^{+3}$, which was caused by electron transition from $^1G_4$ level to $^3H_5$ level, and the fluorescence emission of $Er^{+3}$, which was caused by electron transition from $^4I_{13/2}$ level, to the $^4I_{15/2}$ level were observed simultaneously at the wavelengths of 1.3 μm and 1.55 μm, respectively (see FIG. 1(e)). The intensify of fluorescence was saturated, i.e., at the maximum level, at each wavelength. Also, the fluorescence lifetime of $Pr^{+3}$ at the $^1G_4$ level was 794 μsec, and the fluorescence lifetime of $Er^{+3}$ at the $^4I_{11/2}$ and $^4I_{13/2}$ levels was 1870 μsec and 3240 μsec, respectively (see FIG. 2).

According to Example 5, as shown in FIG. 3, the simultaneous fluorescence emission at the wavelength of 1.3 μm by $Pr^{+3}$ at the $^1G_4$ level and at the wavelength of 1.55 μm by $Er^{+3}$ at the $^4I_{13/2}$ level was due to effective energy transfer indicated by "b". The fluorescence lifetime of $Er^{+3}$ at the $^4I_{11/2}$ and $^4I_{13/2}$ levels was slightly decreased, compared to Example 4, because the energy transfer indicated by "b" and "e" were saturated.

EXAMPLE 6

Ge, Ga and S, having a purity of 99.999% or more, were weighed in an atomic ratio of 25:5:70 in a glove box where the content of hydroxy (OH) group and oxygen was maintained to be 10 ppm or less, and 300 ppm of $Pr^{+3}$ and 300 ppm of $Er^{+3}$ were added.

After filling a SiO$_2$ test tube with the composition, the test tube was left under a vacuum condition of 0.1 mTorr for a predetermined period of time. Then, the test tube was made airtight by sealing it with an oxy-propane flame.

Following this, the test tube was put into a rocking furnace such that the composition comprised in the test tube was completely mixed, and the resultant was kept at 950° C. for 12 hours. Then, the test tube was quenched in air, and heated in a furnace which was set at 260° C. for 1 hour. After the heating process, the test tube was slowly cooled to room temperature and broken into pieces, resulting in an optical fiber formed of a Pr$^{+3}$ and Er$^{+3}$ doped sulfide glass of Ge$_{25}$Ga$_5$S$_{70}$ in which the amount of lattice vibration relaxation was slight.

The optical fiber was cut into a disc shape (having a diameter of 10 mm and a thickness of 3 mm) and polished. Then, the fluorescence spectrum and fluorescence lifetime of the resultant were measured using a laser beam having a wavelength of 980 mn as a source of light excitation. At this wavelength, Er$^{+3}$ at the $^4I_{11/2}$ level showed a maximum light absorption.

Figure 6:
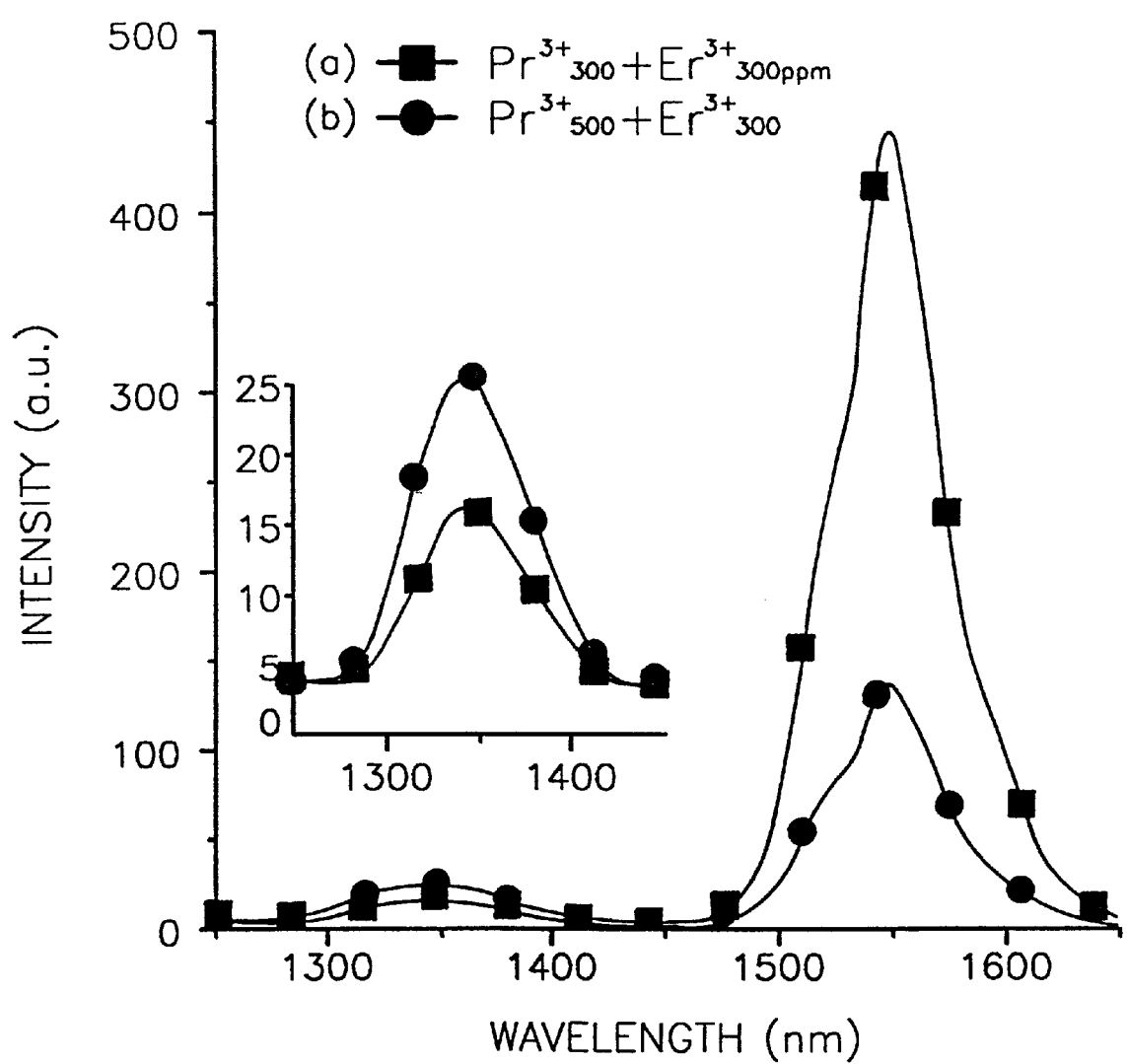
FIG. 6 shows the fluorescence emission spectrum at the wavelengths of 1.3 $\mu$m and 1.55 $\mu$m according to the amount of $Pr^{+3}$ in optical fibers, when a laser beam having a wavelength of 980 nm is irradiated onto an optical fiber which is formed by doping a $Ge_{29}AsOGa_1S_{62}$ glass with $Pr^{+3}$ and $Er^{+3}$, wherein the fluorescence emission at the wavelength of 1.3 $\mu$m is due to the electron transition of $Pr^{3+}$ from the $^1G_4$ level to the $^3H_5$ level, and that at the wavelength of 1.55 $\mu$m is due to the electron transition of $Er^{3+}$ from the $^4I_{13/2}$ level to the $^4I_{11/2}$ level.

As a result, the fluorescence emission of Pr$^{+3}$, which was caused by electron transition from $^1G_4$ level to $^3H_5$ level, and the fluorescence emission of Er$^{+3}$, which was caused by electron transition from $^4I_{13/2}$ level, to the $^4I_{15/2}$ level were observed simultaneously at the wavelengths of 1.3 μm and 1.55 μm, respectively (see FIG. 6(a)).

According to Example 6, it can be understood that both a Ge—Ga—S glass doped with Pr$^{+3}$ and Er$^{+3}$ and a Ge—As—Ga—S glass doped with Pr$^{+3}$ and Er$^{+3}$ can be used as a material of an optical amplifier which can be used at both 1.3 μm and 1.55 μm.

EXAMPLE 7

An optical fiber was manufactured in the same manner as in Example 6 except that the amount of Pr$^{+3}$ was increased to 500 ppm. Then, the optical fiber was cut into a disc shape (having a diameter of 10 mm and a thickness of 3 mm) and polished. Then, the fluorescence spectrum and fluorescence lifetime of the resultant were measured using a laser beam having a wavelength of 980 nm as a source of light excitation. At this wavelength, Er$^{+3}$ at the $^4I_{11/2}$ level showed a maximum light absorption.

As a result, the fluorescence emission of Pr$^{+3}$, which was caused by electron transition from $^1G_4$ level to $^3H_5$ level, and the fluorescence emission of Er$^{+3}$, which was caused by electron transition from $^4I_{13/2}$ level, to the $^4I_{15/2}$ level were observed simultaneously at the wavelengths of 1.3 μm and 1.55 μm, respectively (see FIG. 6(b)). Also, as the amount of Pr$^{+3}$ was increased, energy transfer in directions indicated by "b" and "e" in FIG. 3 increased. As a result, the fluorescence intensity of Pr$^{+3}$ at the $^1G_4$ level increased at the wavelength of 1.3 μm, whereas that of Er$^{+3}$ at the $^4I_{13/2}$ level decreased at the wavelength of 1.55 μm. However, the rate at which the fluorescence intensity increases at 1.3 μm is slower than the rate at which the fluorescence intensity decreases at 1.55 μm, and thus it can be inferred that the energy transfer indicated by "e" is more rapid than that indicated by "b". Summing up the results, it can be understood that increasing the concentration of Pr$^{+3}$ is undesirable.

As described above, the optical fiber used in an optical amplifier according to the present invention can be applied to both wavelengths of 1.3 μm and 1.55 μm, improving light amplification efficiency compared to a conventional optical fiber amplifier containing only Pr$^{+3}$.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical fiber for an optical amplifier, which is formed by doping glass with rare-earth ions, wherein both praseodymium ions (Pr$^{+3}$) and erbium ions (Er$^{+3}$) are used as the rare-earth ions, and the glass is a sulfide glass; and
    wherein the sulfide glass is one of a germanium-arsenic-gallium-sulfide (Ge—As—Ga—S) glass and a Ge—As—S glass.

2. The optical fiber of claim 1, wherein the mixing weight ratio of Pr$^{+3}$ to Er$^{+3}$ is between 1:1 and 1:3.

3. The optical fiber of claim 1, wherein a laser having a wavelength capable of absorbing Er$^{+3}$ is used as a light source for exciting the optical fiber.

4. The optical fiber of claim 1, wherein the content of Pr$^{+3}$ is 100~1000 ppm and the content of Er$^{+3}$ is 100~5000 ppm.

5. An optical amplifier glass, comprising:
    a glass comprising a sulfide glass;
    Pr$^{+3}$ ion; and
    Er$^{+3}$ ion;
    wherein the sulfide glass is one of a germanium-arsenic-gallium-sulfide (Ge—As—Ga—S) glass and a Ge—As—S glass.

6. The optical amplifier glass of claim 5, the content of Pr$^{+3}$ ion being in the range of approximately 100 to 1000 ppm by weight.

7. The optical amplifier glass of claim 6, the content of Er$^{+3}$ being in the range of approximately 100 to 5000 ppm by weight.

8. The optical amplifier glass of claim 5, the content of Er$^{+3}$ being in the range of approximately 100 to 5000 ppm by weight.

9. The optical amplifier glass of claim 5, the ratio of Pr$^{+3}$ to Er$^{+3}$ being in the range of approximately 1:1 to 1:3 by weight.

10. The optical amplifier glass of claim 5, said glass comprising germanium, arsenic, gallium and sulfur in a mole ratio of approximately 29:8:1:62; and
    the Pr$^{+3}$ content being 300 ppm and the Er$^{+3}$ content being 300 ppm by weight.

11. The optical amplifier glass of claim 5, said glass comprising germanium, arsenic, gallium and sulfur in a mole ratio of approximately 29:8:1:62; and
    the Pr$^{+3}$ content being 300 ppm and the Er$^{+3}$ content being 500 ppm by weight.

12. The optical amplifier glass of claim 5, said glass comprising germanium, arsenic, gallium and sulfur in a mole ratio of approximately 29:8:1:62; and
    the Pr$^{+3}$ content being 300 ppm and the Er$^{+3}$ content being 700 ppm by weight.

13. The optical amplifier glass of claim 5, said glass comprising germanium, arsenic, gallium and sulfur in a mole ratio of approximately 29:8:1:62; and
    the Pr$^{+3}$ content being 300 ppm and the Er$^{+3}$ content being 1000 ppm by weight.

14. The optical amplifier glass of claim 5, said glass comprising germanium, arsenic, gallium and sulfur in a mole ratio of approximately 29:8:1:62; and
    the Pr$^{+3}$ content being 300 ppm and the Er$^{+3}$ content being 1500 ppm by weight.

15. The optical amplifier glass of claim 5, said glass comprising germanium, gallium and sulfur in a mole ratio of approximately 25:5:70; and the $Pr^{+3}$ content being 300 ppm and the $Er^{+3}$ content being 300 ppm by weight.

16. The optical amplifier glass of claim 5, said glass comprising germanium, gallium and sulfur in a mole ratio of approximately 25:5:70; and the $Pr^{+3}$ content being 500 ppm and the $Er^{+3}$ content being 300 ppm by weight.

17. An optical amplifier comprising an optical fiber formed of an optical amplifier glass, said optical amplifier glass comprising:

a glass comprising a sulfide glass;

$Pr^{+3}$ ion; and $Er^{+3}$ ion;

wherein the sulfide glass is one of a germanium-arsenic-gallium-sulfide (Ge—As—Ga—S) glass and a Ge—As—S glass.

18. The optical amplifier of claim 17, further comprising:

a laser emitting 980 nm light, for exciting the optical fiber.

19. A method of amplifying light in the 1.3 and 1.55 μm wavelength bands, comprising the steps of:

providing an optical amplifier glass comprising a glass which is a sulfide glass, and further comprising $Pr^{+3}$ ion and $Er^{+3}$ ion; and exciting the optical amplifier glass with 980 nm laser light, for exciting both the $Pr^{+3}$ ion and $Er^{+3}$ ions;

wherein the sulfide glass is one of a germanium-arsenic-gallium-sulfide (Ge—As—Ga—S) glass and a Ge—As—S glass.

20. An optical amplifier glass, comprising:

a glass consisting of sulfide glass;

$Pr^{+3}$ ion; and $Er^{+3}$ ion;

wherein the glass comprises germanium, arsenic, gallium and sulfur in a mole ratio of approximately 29:8:1:62; and wherein the $pr^{+3}$ content is 300 ppm and the $Er^{+3}$ content is in the range of 300 ppm to 1500 ppm by weight.

21. The optical amplifier glass of claim 20, the content of $Pr^{+3}$ ion being in the range of approximately 100 to 1000 ppm by weight.

22. The optical amplifier glass of claim 21, the content of $Er^{+3}$ being in the range of approximately 100 to 5000 ppm by weight.

23. The optical amplifier glass of claim 20, the content of $Er^{+3}$ being in the range of approximately 100 to 5000 ppm by weight.

24. The optical amplifier glass of claim 20, the ratio of $Pr^{+3}$ to $Er^{+3}$ being in the range of approximately 1:1 to 1:3 by weight.

25. An optical amplifier comprising an optical fiber formed of an optical amplifier glass, said optical amplifier glass comprising:

a glass comprising a sulfide glass;

$Pr^{+3}$ ion; and $Er^{+3}$ ion;

wherein the glass comprises germanium, arsenic, gallium and sulfur in a mole ratio of approximately 29:8:1:62; and wherein the $Pr^{+3}$ content is 300 ppm and the $Er^{+3}$ content is in the range of 300 ppm to 1500 ppm by weight.

26. The optical amplifier of claim 25, further comprising:

a laser emitting 980 nm light, for exciting the optical fiber.

27. A method of amplifying light in the 1.3 and 1.55 μm wavelength bands, comprising the steps of:

providing an optical amplifier glass comprising a glass which is a sulfide glass, and further comprising $Pr^{+3}$ ion and $Er^{+3}$ ion; and exciting the optical amplifier glass with 980 nm laser light, for exciting both the $Pr^{+3}$ ion and $Er^{+3}$ ions;

wherein the glass comprises germanium, arsenic, gallium and sulfur in a mole ratio of approximately 29:8:1:62; and wherein the $Pr^{+3}$ content is 300 ppm and the $Er^{+3}$ content is in the range of 300 ppm to 1500 ppm by weight.

* * * * *